Nov. 26, 1940.　　　D. D. WALLACE　　　2,222,922
PISTON RING
Filed June 24, 1938
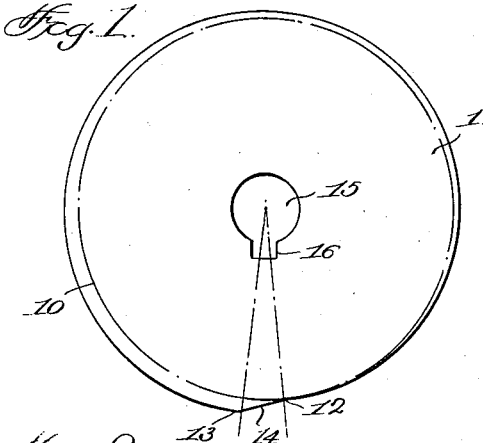
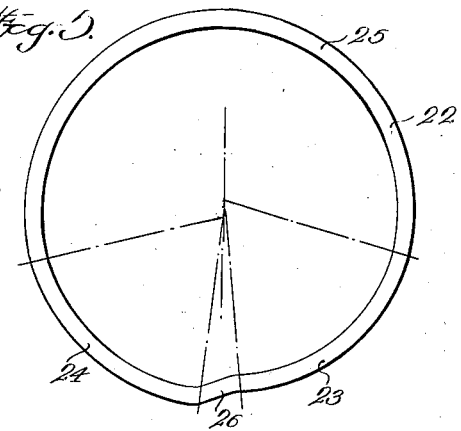
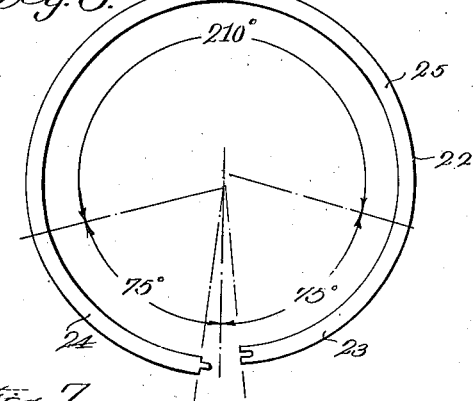
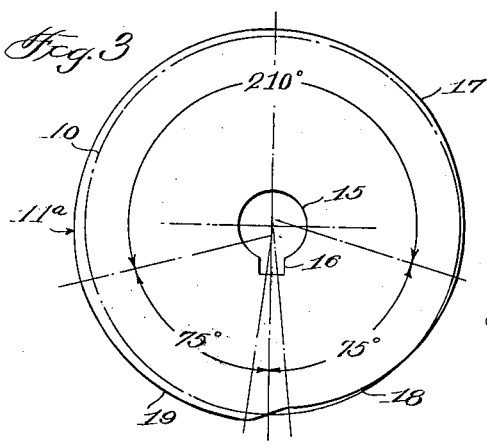
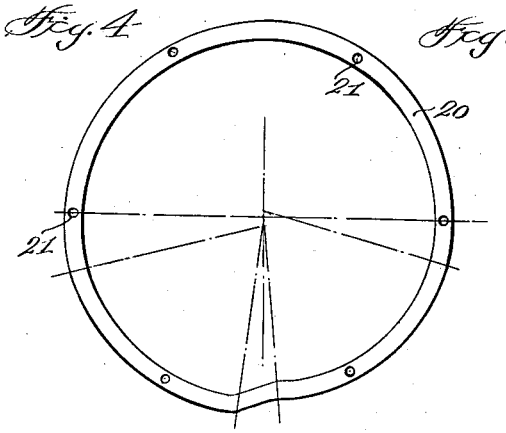
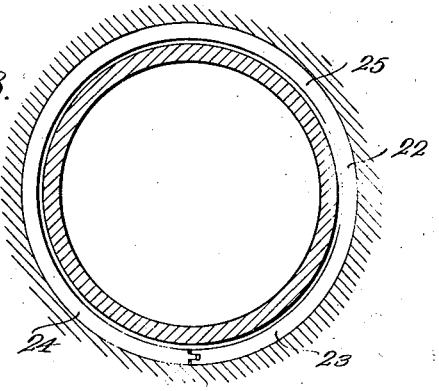
Donald D. Wallace
INVENTOR
BY Victor J. Evans & Co.
ATTORNEYS Patented Nov. 26, 1940

2,222,922

UNITED STATES PATENT OFFICE 2,222,922

PISTON RING

Donald D. Wallace, Muskegon, Mich.

Application June 24, 1938, Serial No. 215,666

4 Claims. (Cl. 309—44)

In the manufacture of piston rings the greatest difficulty encountered is the production of a ring which will bear uniformly against the cylinder wall throughout the circumference of the ring. In the conventional or ordinary type of ring, the pattern for the same is first turned to true circular form to size and then, by means of a metal set-in placed in the mill-out or gap, it is expanded, so that the ring formed from the pattern, when the set-in is removed will exert an uneven pressure on the cylinder wall when seated in the ring groove of the piston. With such a type of ring, the expansion is greatest 90° from the gap, on either side of the latter. Hence when the ring is compressed, as when engaged with the wall of the cylinder, the points of greatest pressure are 90° on opposite sides of the ring gap. Furthermore, this condition results in failure of the ring to bear fully against the cylinder wall at other points and makes for the greatest wear at the 90° points which results in fluttering points around the ring, particularly at the gap, allowing leakage of compression with the added disadvantage of the admission of oil in excessive quantities into the combustion chamber of the cylinder.

With these practical disadvantages known, it is the object of the present invention to provide a piston ring which, when inserted in the piston groove and contracted to enter a cylinder bore will, at all points throughout its perimeter, have a bearing contact with the cylinder wall of uniform pressure radially of the piston; and to provide a ring having such advantages in a construction of simple form and one susceptible of cheap manufacture.

With this object in view, the invention consists in a construction and combination of parts of which a preferred embodiment is illustrated in the accompanying drawing but to which the invention is not to be restricted. Practical application may dictate certain changes or alterations and the right is claimed to make any which fall within the spirit of the invention.

In the drawing:

Figure 1 is a plan view of a cam such as is used in producing the ring pattern by means of a profiling machine.

Figure 2 is an elevational view of the structure of Figure 1.

Figure 3 is a view similar to Figure 1 after the final peripheral contour of the cam is obtained.

Figure 4 is a plan view of a ring pattern produced by the use of a cam such as shown in Figure 3.

Figure 5 is a plan view of the ring casting prior to finishing.

Figure 6 is a plan view of the finished ring.

Figure 7 is an elevational view of Figure 6.

Figure 8 is a cross sectional view of an engine cylinder and piston showing the improved ring in the ring groove of the latter and bearing throughout against the wall of the former.

The ring constituting the invention is designed to have a progressively increasing radius throughout an intermediate portion of its perimeter and a progressively reduced radius throughout the two remaining portions to the ring gap, thus giving the ring a contour of the general form of a flat spiral. With respect to a base circle, or working circle as it may be called and as indicated at 10, one end of the ring is within this circle, progressively increasing in radius from this point for an angular distance of approximately 75°, between which and the said end the ring outline crosses the base circle, progressively increasing its radial extent beyond the latter to a point approximately 75° from the opposite end, when the radius begins to decrease progressively but at a slight enough rate to leave the opposite end of the ring beyond the base circle. This will best be appreciated by reference to Figure 3 which discloses the cam used on a profiling machine and which is the finished product derived from the partly finished cam 11 illustrated in Figure 1 in which the radius is progressively increased from the point 12 to the point 13. The drop or fall 14 illustrated in drawing constitutes the usual length of mill-out. The cam 11 is mounted on the shaft of the profiling machine, having an eye 15 in which the shaft is received and a key slot 16 in which the key of the profiling machine shaft may engage.

When the profiling cam is in the finished form 11a, as illustrated in Figure 3, its peripheral contour is the same as that above described for the peripheral contour of the ring, the segment 17 being that segment in which the radius is progressively increased and the segments 18 and 19 the segments in which the radius is progressively reduced from the points where they connect with the segment 17.

From such a cam as shown in Figure 3, the ring pattern 20 shown in Figure 4 is produced, the holes 21 being provided to pin the pattern to the plate in making up the ring mold for foundry casting.

The ring casting 22 being reproduced from the pattern, has the proper peripheral contour, so that the segments, 23, 24 and 25 have the same peripheral form as the segments 18, 19 and 17 of the cam 11a. The segment 26 is then milled out and the ends of the ring finished to give the desired kind of joint. In the illustrated form of the invention, the tongue and groove joint is shown, the end of segment 23 being grooved and the end of segment 24 formed with a tongue. However, the ring ends may be finished to give either the angle joint, the lap joint, or butt joint, whichever is desirable.

After milling out the segment 26 and providing the kind of joint desired, the ring casting is then finished according to conventional practice, as by setting the ring in a ring arbor for the exterior diameter to be turned to proper size.

Unmounted, the ring 22 assumes the form shown in Figure 6 in which the slotted end of the segment 23 is within the base circle, the periphery of the ring crossing the base circle adjacent the intermediate segment 25 throughout the periphery of which there is a progressive increase of its radial extent beyond the base circle, the radial extent beyond the base circle of the segment 24 gradually diminishing to the tongue end of the ring.

When a ring so formed is placed in the piston groove and the latter inserted in the cylinder, the compression of the arcs of the segments 25 and 24 into arcs of reduced radius, tends to lengthen the radius of the arc of the segment 23. In such a ring, there is no undue bearing radially of the ring against the cylinder wall at any point. For all practical purposes, the ring bears uniformly against the cylinder wall at all points throughout its periphery.

The invention having been described, what is claimed as new and useful is:

1. A piston ring of progressively diminishing radius extending throughout segments having an angular extent of approximately 75° from its ends, the intervening segment being of progressively increasing radius.

2. A piston ring inherently resilient with its extremities lying respectively within and without a base circle of the approximate diameter of the cylinder wherein it will be used, the radius of the ring progressively increasing from the inner end through an arc of approximately 285° and thereafter progressively diminishing to the remaining end.

3. A piston ring of progressively diminishing radius extending throughout segments having an angular extent of approximately 75° from 'ts ends, the intervening segment being of progressively increasing radius, the opposite ends of the ring lying respectively within and without a base circle of approximately the same radius as the cylinder within which the ring will be used.

4. A resilient split and normally end-gapped flat spiral piston ring having a major intermediate body segment of progressively increasing radius throughout the length thereof and the outer peripheral face of the segment being entirely outside a base circle of approximately the same diameter as the cylinder within which the ring will be used, and two continuity completing lesser segments respectively extending from the ends of said major intermediate segment to the free ends of the ring, both of said lesser segments progressively diminishing in radius from the intermediate segment to their respective ends, the lesser segment which extends from the end of the intermediate segment of shortest radius crossing, at a point in its length, the base circle so that its free end terminates within the circle and the other lesser segment having its outer peripheral face entirely outside the base circle.

DONALD D. WALLACE.